US011742910B2

(12) United States Patent
Liu et al.

(10) Patent No.: US 11,742,910 B2
(45) Date of Patent: Aug. 29, 2023

(54) MULTI-USER UPLINK AND DOWNLINK BEAM ALIGNMENT METHOD FOR ASYMMETRIC MILLIMETER WAVE LARGE-SCALE MIMO

(71) Applicant: ZHEJIANG UNIVERSITY, Zhejiang (CN)

(72) Inventors: Yongcheng Liu, Zhejiang (CN); Min Li, Zhejiang (CN); Minjian Zhao, Zhejiang (CN); Liyan Li, Zhejiang (CN); Jiayu Zhang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/168,439

(22) Filed: Feb. 13, 2023

(65) Prior Publication Data

US 2023/0188185 A1 Jun. 15, 2023

Related U.S. Application Data

(63) Continuation of application No. PCT/CN2022/082606, filed on Mar. 23, 2022.

(30) Foreign Application Priority Data

Sep. 17, 2021 (CN) .......................... 202111093092.9

(51) Int. Cl.
*H04B 7/02* (2018.01)
*H04B 7/0456* (2017.01)

(52) U.S. Cl.
CPC ................................. *H04B 7/0456* (2013.01)

(58) Field of Classification Search
CPC .................................................... H04B 7/0456
(Continued)

(56) References Cited

U.S. PATENT DOCUMENTS 7,315,276 B1 1/2008 Rihaczek et al.
10,425,136 B2 * 9/2019 Kim ..................... H04B 7/0617
(Continued)

FOREIGN PATENT DOCUMENTS

CN 106911371 6/2017
CN 106911371 A * 6/2017
(Continued)

OTHER PUBLICATIONS

Ma et al., "Deep learning based beam selection for uplink millimeter wave communications," Journal of Hefei University of Technology (Natural Science), Dec. 2019, vol. 42, No. 12.
(Continued)

*Primary Examiner* — Helene E Tayong
(74) *Attorney, Agent, or Firm* — Hodgson Russ LLP

(57) ABSTRACT

A multi-user uplink and downlink beam alignment method for asymmetric millimeter wave large-scale MIMO includes constructing an all-digital multi-directional beam for multiple-direction probing; performing multiple rounds of downlink beam training from the base station to the UE; controlling the UE to perform a beam decision according to the receiving signals, and determining a target downlink sending-receiving beam pair; performing data processing on the receiving signals to generate training data for predicting an uplink sending narrow beam, and performing training on a preset neural network; performing online real-time signal detection based on the trained network parameters and the receiving signals to predict a target uplink sending narrow beam; and controlling the UE to feedback an index of a target downlink sending narrow beam to the base station, and widening the target downlink sending narrow beam into a target uplink receiving beam according to the feedback index.

18 Claims, 5 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2012/0320874 A1* | 12/2012 | Li | ........................ H04W 48/12 |
| | | | 370/328 |
| 2013/0051382 A1 | 2/2013 | Derham | |
| 2019/0044596 A1 | 2/2019 | Bolotin et al. | |
| 2019/0312623 A1 | 10/2019 | Park et al. | |
| 2020/0252923 A1* | 8/2020 | Yerramalli | ............ H04W 72/51 |
| 2020/0314603 A1* | 10/2020 | Choi | .................... H04B 7/0452 |
| 2021/0050892 A1 | 2/2021 | Park et al. | |
| 2021/0234597 A1 | 7/2021 | Raghavan et al. | |

FOREIGN PATENT DOCUMENTS

| | | | |
|---|---|---|---|
| CN | 107211285 | | 9/2017 |
| CN | 109155659 | | 1/2019 |
| CN | 111193533 A | * | 5/2020 |
| CN | 111245493 | | 6/2020 |
| CN | 111786708 A | * | 10/2020 |
| CN | 111917446 | | 11/2020 |
| CN | 112073106 | | 12/2020 |
| CN | 112994765 A | * | 6/2021 |
| CN | 113242071 | | 8/2021 |
| CN | 113348631 | | 9/2021 |
| CN | 113890580 | | 1/2022 |
| KR | 101102955 B1 | * | 1/2012 |

OTHER PUBLICATIONS

CNIPA, First Office Action for CN Application No. 202111093092.9, dated May 5, 2022.

CNIPA, Notification to Grant Patent Right for Invention for CN Application No. 202111093092.9, dated Jun. 22, 2022.

WIPO, International Search Report and Written Opinion for PCT/CN2022/082606, dated Jun. 14, 2022.

* cited by examiner

MULTI-USER UPLINK AND DOWNLINK BEAM ALIGNMENT METHOD FOR ASYMMETRIC MILLIMETER WAVE LARGE-SCALE MIMO

CROSS-REFERENCE TO RELATED APPLICATIONS

This application is a continuation of International Application No. PCT/CN2022/082606, filed on Mar. 23, 2022, which claims priority to Chinese Patent Application No. 202111093092.9, filed on Sep. 17, 2021, the entire disclosures of which are incorporated herein by reference.

FIELD

The present disclosure relates to the technical field of wireless communication, especially to a multi-user uplink and downlink beam alignment method for asymmetric millimeter wave large-scale multiple-input multiple-output (MIMO), a multi-user uplink and downlink beam alignment apparatus for asymmetric millimeter wave large-scale multiple-input multiple-output (MIMO), and a storage medium.

BACKGROUND

With the continuous development of society and economy, various applications such as VR, AR, 3D media, and ultra-high definition video transmission emerge in endlessly, so the service quantity of wireless communication data also shows a significant upward trend. However, as an indispensable carrier for building a new generation of information infrastructure, radio spectrum resources are becoming more and more scarce, and the problem of insufficient resources structure is becoming more and more prominent.

Millimeter wave has great development potential because of its advantages such as abundant spectrum resources and high spectrum efficiency, but its characteristics such as severe channel propagation path loss bring a lot of technical difficulties to the actual implementation and deployment of millimeter wave communication. In order to overcome the serious path loss, it is necessary to use a large-scale antenna array and beamforming in a transceiver to adapt to directional transmission in a millimeter wave system. In order to obtain large beamforming gain, it is necessary to adaptively control and align transmitting and receiving beams of a base station (abbreviated as BS) and a user equipment (abbreviated as UE). Assuming perfect channel knowledge, there are many optimized hybrid analog and digital BS/UE beamforming solutions under constraints of different hardware resources. However, considering the large-scale antenna array used, in millimeter wave communication, it is a difficult task to accurately estimate a channel (i.e., all elements of a channel matrix) by existing solutions. Another feasible method of beam alignment in the millimeter wave is beam training by spatial scanning, in which the base station and a user jointly train base station/user beamforming pairs in a pre-designed codebook representing beam search space to find their dominant paths. As mentioned above, a millimeter wave all-digital large-scale multiple-input multiple-output (MIMO) system will be a best choice for B5G and 6G, but its high overhead, high complexity and high power consumption restrict its development and application.

In related arts, the concept of an asymmetric millimeter wave large-scale multiple-input multiple-output (MIMO) system that may reduce the overhead, complexity and power consumption of millimeter wave all-digital multi-beam arrays is put forward. All-digital multi-beam transmitting and receiving arrays are designed asymmetrically, and a large-scale all-digital multi-beam transmitting array and a small-scale all-digital multi-beam receiving array are adopted at the base station, so as to generate a narrower transmitting multi-beam and a wider receiving multi-beam. The UE may keep a traditional symmetric form or adopt an asymmetric form. There are two design formats for the asymmetric millimeter wave large-scale multiple-input multiple-output (MIMO) system. One is that the transmitting and receiving arrays are different in size and number of RF channels, and the other is that the transmitting and receiving arrays are the same but different in a number of RF channels.

However, the applicant found that, different from the symmetric MIMO system, the traditional beam alignment method needs beam training for uplink and downlink respectively to obtain an uplink and downlink sending-receiving beam pair in the asymmetric system, which requires high training overhead.

SUMMARY

A first aspect of the present disclosure provides a multi-user uplink and downlink beam alignment method for asymmetric millimeter wave large-scale multiple-input multiple-output (MIMO). The method includes constructing a multi-directional beam codebook, and constructing an all-digital multi-directional beam for multiple-direction probing through optimized codewords in the codebook; controlling a base station to send the multi-directional beam, controlling a user equipment (UE) to receive the multi-directional beam by using a receiving beam, and determining a matched filtering output of receiving signals at the UE for multiple rounds of downlink beam training from the base station to the UE; controlling the UE to perform a beam decision according to the receiving signals, and determining a target downlink sending-receiving beam pair with maximum receiving power from the receiving signals received in the multiple rounds of downlink beam training; performing data processing on the receiving signals at different signal-to-noise ratios received by the UE to generate training data for predicting an uplink sending narrow beam from the UE to the base station, and performing offline training on a preset convolutional neural network via the training data to obtain trained network parameters; performing online real-time signal detection based on the trained network parameters and the receiving signals at the UE to predict a target uplink sending narrow beam from the UE to the base station; and controlling the UE to feedback an index of a target downlink sending narrow beam at the base station to the base station, and widening the target downlink sending narrow beam into a target uplink receiving beam at the base station.

A second aspect of the present disclosure also provides a non-transitory computer-readable storage medium having stored therein computer programs that, when executed by a processor, cause the multi-user uplink and downlink beam alignment method for asymmetric millimeter wave large-scale multiple-input multiple-output (MIMO) described in the first aspect to be implemented.

A third aspect of the present disclosure also provides a multi-user uplink and downlink beam alignment device for asymmetric millimeter wave large-scale multiple-input multiple-output (MIMO) including a processor; and a memory communicatively connected with the processor; in which the memory stores instructions executable by the processor that, when executed by the processor, cause the processor to perform the multi-user uplink and downlink beam alignment method for asymmetric millimeter wave large-scale multiple-input multiple-output (MIMO) described in the first aspect.

Additional aspects and advantages of the present disclosure will be set forth in part in the following description which follows and, in part, will be apparent from the description, or may be learned by practice of the present disclosure.

BRIEF DESCRIPTION OF THE DRAWINGS

The above and/or additional aspects and advantages of the present disclosure will become apparent and easy to understand from the description of embodiments in conjunction with the accompanying drawings below.

DETAILED DESCRIPTION

Figure 1:
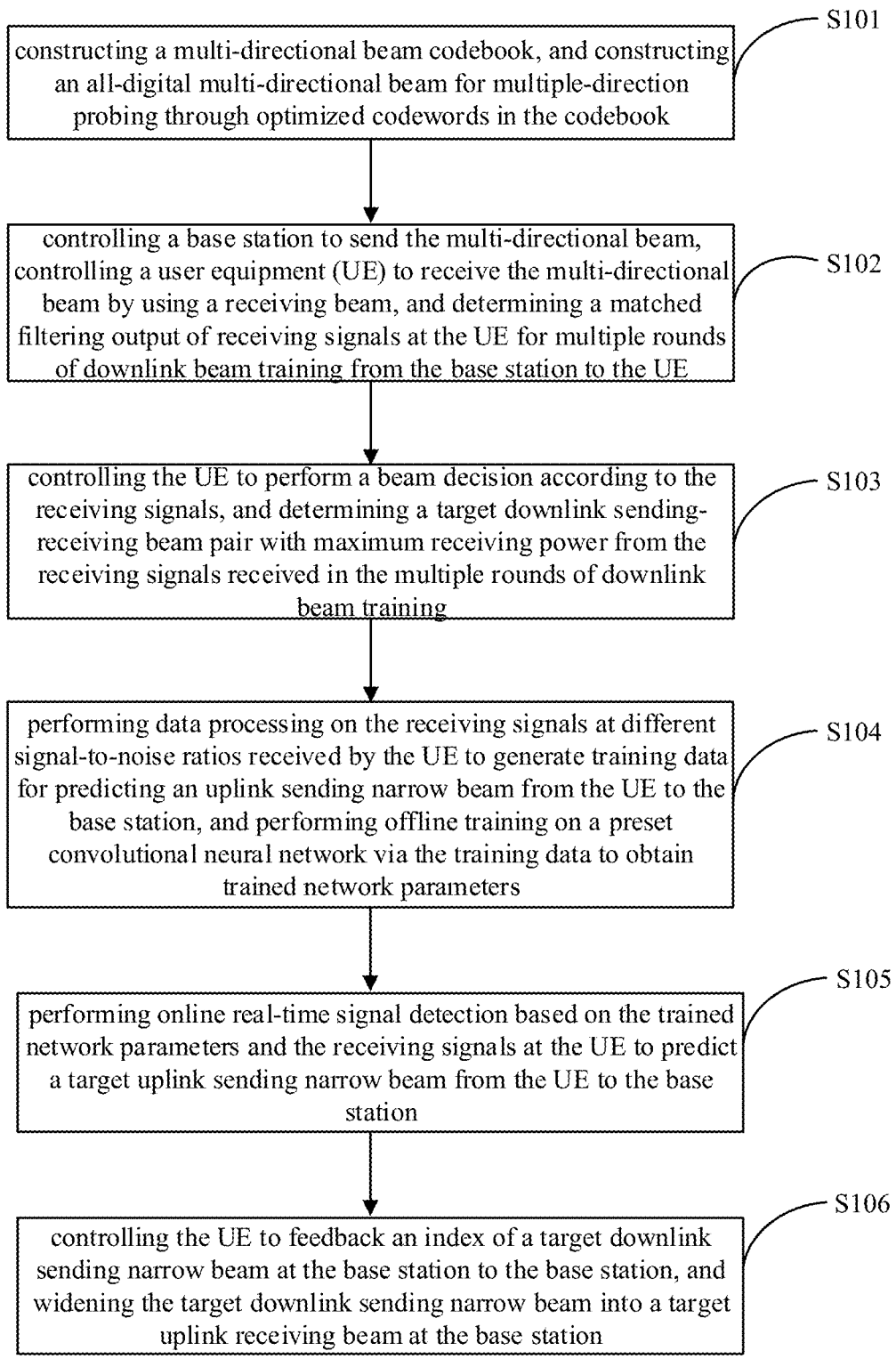
FIG. 1 is a flow chart showing a multi-user uplink and downlink beam alignment method for asymmetric millimeter wave large-scale multiple-input multiple-output (MIMO) provided by an embodiment of the present disclosure.

Reference will be made in detail to embodiments of the present disclosure, and examples of which are illustrated in the accompanying drawings. The same or similar elements and the elements having same or similar functions are denoted by like reference numerals throughout the descriptions. The embodiments described below with reference to accompanying drawings are illustrative, and intended to explain the present disclosure, and shall not be construed to limit the present disclosure.

A multi-user uplink and downlink beam alignment method for asymmetric millimeter wave large-scale multiple-input multiple-output (MIMO), and a multi-user uplink and downlink beam alignment apparatus for asymmetric millimeter wave large-scale multiple-input multiple-output (MIMO) provided by an embodiment of the present disclosure are described below with reference to the accompanying drawings.

FIG. 1 is a flow chart showing a multi-user uplink and downlink beam alignment method for asymmetric millimeter wave large-scale multiple-input multiple-output (MIMO) provided by an embodiment of the present disclosure. As shown in FIG. 1, the method includes steps S101 to S106.

In step S101, a multi-directional beam codebook is constructed, and an all-digital multi-directional beam for multiple-direction probing is constructed through optimized codewords in the codebook.

The uplink and downlink beam in the embodiment of the present disclosure include a downlink sending-receiving beam pair from a base station to a user equipment (UE), an uplink sending narrow beam from the UE to the base station, and an uplink receiving beam at the base station.

In the embodiment of the present disclosure, downlink beam training from the base station to the UE is performed firstly, in which an all-digital multi-directional beam corresponding to multi-directional of the multi-user is constructed for an application scenario of the multi-user, so as to perform beam training simultaneously for the multi-user.

The beam training codebook in the present disclosure adopts digital beam codewords, which may be optimally designed according to a central directional angle and a beam width of each codeword.

In an embodiment of the present disclosure, constructing the multi-directional beam codebook includes constructing a minimum mean square error function for optimizing the multi-directional beam, and solving the minimum mean square error function by a Riemannian manifold optimization algorithm to obtain optimized codewords transmitted in different directions, and combining the codewords to generate the multi-directional beam codebook.

It is to be noted that a gain of an ideal beam within its coverage angle is constant, while a gain of the range outside its coverage angle is zero, and all ideal beams of different central angles may cover entire search space without overlapping. In order to approximate the constructed beam in the present disclosure to the ideal beam, in an embodiment of the present disclosure, an interval $[-1,1]$ may be discretized in steps of $\Delta\,\delta$, and $\emptyset_j=-1+(j-1)\,\Delta\,\delta$, then when $\emptyset_j \in [-\delta,\delta], g_j=1/\delta$, or $g_j=0$. Further, the minimum mean square error is used to model an optimization problem. In the embodiment, the minimum mean square error function is expressed by:

$$\min\ f(w) = \left\| U^H w \odot (U^H w)^* - g \odot g^* \right\|_2^2$$

$$\text{s.t. } w^H w = 1,\ g = \begin{cases} W, \text{ if } \emptyset \in \emptyset_{w_i} \\ 0, \text{ else} \end{cases}$$

where w represents a unidirectional beam, $U=[u(\emptyset^1, L_T), \ldots, u(\emptyset^N, L_T)]$, $u(\emptyset^n, L_T)$ represents an array response vector, $\emptyset^n$ represents a departure angle, $\odot$ represents Hadmard product, g represents an ideal gain vector, $L_T$ represents a size of the codebook sent by the base station in downlink transmission, and g* represents an element-wise conjugate of the ideal gain vector. It is to be understood that solving the above-mentioned minimum mean square error is a Riemannian manifold optimization problem. When solving the minimum mean square error function by the Riemannian manifold optimization algorithm in the embodiment of the present disclosure, as an example, the beam optimization and solution may be completed by a related algorithm of MATLAB.

Further, a plurality of optimized codeword is obtained after the minimum mean square error is solved, and $\tilde{w}(j)$ represents an optimized codeword transmitted in a direction $\alpha(j)$, which constitutes a multi-directional beam detection in M directions (assuming M[1], M[2], ..., M[M]) simultaneously, which may be expressed by the following formula in an embodiment of the present disclosure:

$$[w_1(M[1]), w_2(M[2]), \ldots, w_M(M[M])] = \frac{[\tilde{w}(M[1]) + \tilde{w}(M[2]) + \ldots + \tilde{w}(M[M])]}{\|\tilde{w}(M[1]) + \tilde{w}(M[2]) + \ldots + \tilde{w}(M[M])\|_2}$$

where M[·] represents a direction of the multi-directional beam, M represents the number of directions of the multi-directional beam, and $\tilde{w}(\cdot)$ represents an optimized codeword transmitted in any direction.

Therefore, constructing the all-digital multi-directional beam for multiple-direction probing according to the optimized codeword in the codebook is realized.

In step S102, a base station is controlled to send the multi-directional beam, a user equipment (UE) is controlled to receive the multi-directional beam by using a receiving beam, and a matched filtering output of receiving signals at the UE is determined for multiple rounds of downlink beam training from the base station to the UE.

In some embodiment, when the embodiment of the present disclosure performs downlink beam training, multiple rounds of beam training are performed from the base station to the UE. When a beam is sent, the multi-directional beam constructed in step S101 is used to reduce the number of observations, while the UE uses a wider beam with incomplete accuracy to receive.

In an embodiment of the present disclosure, the base station sends a plurality of training symbols and determines a combination of directions for collecting observation signals in any training symbol in each round of downlink beam training from the base station to the UE, in which the observation signals are the receiving signals received by the UE, that is to say, the present disclosure determines a combination of downlink sending directions of the base station corresponding to the receiving signals in each round of training, and the multiple rounds of downlink beam training from the base station to the UE includes sending, by the base station, a preset number of pilot sequences in each round of downlink beam training; determining a combined signal corresponding to any training symbol in a current round of downlink beam training received by the UE; and determining a matched filtering output of the combined signal corresponding to the training symbol.

In some embodiment, the present disclosure first establishes a channel matrix between the UE and the base station, and the established channel matrix between the base station and a user n may be expressed by:

$$H_n = \Sigma_{m=1}^{M_n} \gamma_{m,n} u^T(\psi_{m,n}) v(\phi_{m,n}) \in C^{N_R \times N_T},$$

where $M_n$ is a number of component paths from the base station to the user n, $\phi_{m,n}, \psi_{m,n}$ are a departure angle and an arrival angle of a $m^{th}$ component path from the base station to the user n, respectively, $\gamma_{m,n}$ is a channel gain of the $m^{th}$ component path from the base station to the user n, and v and u are an array response vectors of a sender $T_x$ and a receiver $R_x$, respectively.

Moreover, a number of detected directions satisfies $M=2^R$, $R \in Z$, $L_T = ML$.

The process of downlink training at the base station is as follows. This stage includes $1 + \log_2 M$ rounds of beam training, and in each round, the BS sends multiple training symbols. For each round of $r \in \{1, 2, \ldots, \log_2 M + 1\}$, G(r,l) represents a combination of directions (in ascending order) of collecting observation signals in a $l^{th}$ training symbol. Assuming that the total training overhead is $E_{tot}$, $K_r E_{tot}$ represents the training overhead of a $r^{th}$ round, and for $K_r$, $r \in \{1, 2, \ldots, \log_2 M + 1\}$ has:

$$K_1 + K_2 + \ldots + K_{\log_2 M + 1} = 1,$$

$$K_r = \frac{1 - K_1}{\log_2 M}, r \in \{1, 2, \ldots, \log_2 M + 1\}.$$

where a training process of each round of beams may be expressed as follows. A pilot sequence $s \in C^{1 \times n_s}$ with $n_s$ symbols is sent, and a signal of a $l^{th}$ combination of the $r^{th}$ round received by the user n using a beam k may be expressed by:

$$y_{n,r,k,l} = f_{n,k}^H H_n v_{r,l} s + f_{n,k}^H Z_{n,r,k,l} \in C^{1 \times n_s}$$

Further, the matched filtering output is $r_{n,r,k,l} = y_{n,r,k,l} s^H = E h_{n,r,k,l} + z_{n,r,k,l}$, where $v_{r,l} = [w_1^T(G(r,l)[1]), w_2^T(G(r,l)[2]), \ldots, w_M^T(G(r,l)[M])]^T$ represents a codeword of the $l^{th}$ combination of the $r^{th}$ round, $f_{n,k}$ represents a $k^{th}$ codeword of the user n, $h_{n,r,k,l} = f_{n,k}^H H_n v_{r,l}$ represents an effective channel after beamforming by the sender and receiver, $E = ss^H = \|s\|_2^2$ represents energy required for training. $Z_{n,r,k,l} \in C^{1 \times n_s} \sim CN(0, \sigma^2)$ represents a noise matrix.

The beam training for the first and each subsequent round is described in detail below.

Firstly, for r=1, the base station will train L multi-directional beams which may detect M directions simultaneously: $G(1,l) = \{l, l+L, \ldots, l+(M-1)L\}, \forall l \in \{1, 2, \ldots, L\}$. However, the UE may directly adopt an exhaustive sequential scanning in the process of downlink training because the received codebook $L_R$ is relatively small.

In the first round, all candidate beam pairs need to be trained for $L*L_R$ times, and the allocated overhead of each observation is $K_1 E_{tot}/(L*L_R)$. The matched filtering output is:

$$r_{n,1,k,l} = K_1 E_{tot} h_{n,1,k,l}/(L/L_R) + z_{n,1,k,l},$$

and an optimal beam pair is selected, so an optimal receiving beam of the UE may be obtained.

Secondly, in a subsequent $\log_2 M$ round of beam training, the base station uses different combinations of transmitted beam directions to help each user to determine an optimal beam direction, and the UE uses the optimal beam decided in the first round to receive. For $r \in [2, 3, \ldots, \log_2 M + 1]$, each round of beam scanning consists of L/2 combinations ($\forall l \in [1, 2, \ldots, L/2]$), which is expressed by:

$$G(r,l) = \{[G(1,l)]_{1:a(r)}, [G(1,l+L/2)]_{a(r)+1:a(r)},$$

$$[G(1,l)]_{2a(r)+1:3a(r)}, [G(1,l+L/2)]_{3a(r)+1:4a(r)},$$

$$\ldots, [G(1,l)]_{M-2a(r)+1:M-a(r)}, [G(1,l+L/2)]_{M-a(r)+1:M}\},$$

where $a(r) = M/(2^{r-1})$.

Further, it is determined that the matched filtering output of the $r^{th}$ round is:

$$r_{n,r,k,l} = K_r E_{tot} h_{n,r,k,l}/(L/2) + Z_{n,r,k,l}.$$

Therefore, the multiple rounds of downlink beam training from the base station to the UE are performed by determining the combined signal corresponding to any training symbol in the current round of downlink beam training received by the UE; and determining the matched filtering output of the combined signal corresponding to the training symbol.

In step S103, the UE is controlled to perform a beam decision according to the receiving signals, and a target downlink sending-receiving beam pair with maximum receiving power is determined from the receiving signals received in the multiple rounds of downlink beam training.

In some embodiment, after the beam training, each user may independently determine the optimal beam pair thereof according to the receiving power of the receiving signal acquired by the user in the downlink training process, make the beam decision, and select the optimal downlink sending-receiving beam pair.

In an embodiment of the present disclosure, for any user n, let $P_n(r,k,l)=\|r_{n,r,k,l}\|^2$ represent the power received by the user n with a beam k from the $l^{th}$ combination of the $r^{th}$ round beam scanning, and $\hat{A}_n(r)$ represents a candidate set of optimal sending beam directions at the base station after the $r^{th}$ beam scanning. With regard to the beam training mode for the first round and each subsequent round described in step S102, the following is a corresponding description of determining the target downlink sending-receiving beam pair for each round:

Firstly, for r=1:

$$P_n(1,k,l)=\|r_{n,1,k,l}\|^2,$$

then, the sending-receiving beam pair with the maximum receiving power is selected:

$$(l_n^*(1),k^*)=\text{argmax}_{k\in\{1,2\ldots,L_R\},l\in\{1,2,\ldots,L\}}P_n(1,k,l),$$

where k* represents the optimal receiving beam at the UE, and $l_n^*(1)$ represents a multi-beam combination of the maximum power after the first round of beam scanning.

And a candidate direction set of the optimal beam direction after the first round of beam scanning is:

$$\hat{A}_n(1)=G_n(1,l_n^*(1)),$$

where the definition $l_n(r)=\{l\in\{1,2,\ldots,L/2\}|G_n(r,l)\cap A(1)\neq\emptyset\}$ indicates a combination having a common direction with $\hat{A}_n(1)$. The expected receiving power from the covered/uncovered optimal direction corresponding to the multiple beams is approximately $P_n(1, k^*, l_n^*)$ and 0, respectively (ignoring receiver noise and inter-beam interference). A binary decision threshold for judging whether $G_n(r, l_n(r))$ contains receiving power of the optimal beam direction is:

$$P_n^*=p(P_n(1,k^*,l_n^*)+0)=p\|r_{n,1,k,l_n^*}\|^2, p\in(0,1).$$

That is, the present disclosure may judge the optimal downlink sending beam from the base station to the UE from the candidate direction set through the binary decision threshold.

Secondly, for the subsequent $\log_2 M$ rounds, $r \in \{2,3,\ldots,\log_2 M+1\}$, a following new round candidate direction set may be determined by combining the binary decision with $\hat{A}_n(r-1)$:

$$\hat{A}_n(r) = \begin{cases} \hat{A}_n(r-1) \cap G_n(r, l_n(r)), & \text{if } P_n(r, k^*, l) \geq P_n^* \\ \hat{A}_n(r-1) \backslash G_n(r, l_n(r)), & \text{if } P_n(r, k^*, l) < P_n^* \end{cases}, \forall n \in N.$$

After acquiring the candidate direction set, for the subsequent $\log_2 M$ rounds, each round may narrow a range of the candidate set according to the above-mentioned formula of the new candidate direction set, until the target downlink sending-receiving beam pair with the maximum receiving power is finally determined.

In step S104, data processing is performed on the receiving signals at different signal-to-noise ratios received by the UE to generate training data for predicting an uplink sending narrow beam from the UE to the base station, and performing offline training on a preset convolutional neural network via the training data to obtain trained network parameters.

In some embodiment, the prediction of the uplink sending narrow beam from the UE to the base station is performed after determining the optimal downlink sending-receiving beam pair from the base station to the UE. In a specific implementation, the training data is generated first, a known channel matrix is generated according to a channel model, and the optimal beam direction is determined. The base station performs beam training according to step S102, and the UE obtains the receiving signals at different signal-to-noise ratios according to a millimeter wave mobile communication system model, and the training data is obtained after data processing.

In an embodiment of the present disclosure, performing data processing on the receiving signals at different signal-to-noise ratios received by the UE to generate training data for predicting the uplink sending narrow beam from the UE to the base station includes combining the matched filtering output of the receiving signals at different signal-to-noise ratios received by the UE by:

$$r_{n,r}=[r_{n,r,k^*,1}\cdots r_{n,r,k^*,L/2}],\ r\in\{2,3,\ldots,\log_2 M+1\},$$

where $r_{n,1}=[r_{n,1,1,1}\cdots r_{n,1,1,L}, r_{n,1,2,1}\cdots r_{n,1,L_R,L}]$, r represents a training round, n represents any user, k* represents a receiving beam of the UE, $L_R$ represents a size of a receiving codebook at the UE, $L=L_T/M$, and $L_T$ represents a size of a sending codebook at the base station; successively normalizing the receiving signals from individual rounds of downlink beam training and combining normalized signals; and taking real and imaginary parts of the normalized signals and the receiving beam at the UE as the training data.

In some embodiment, for any user n, combining the matched filtering output of the receiving signal of the $r^{th}$ round of the user n into:

$$r_{n,1}=[r_{n,1,1,1}\cdots r_{n,1,1,L},r_{n,1,2,1}\cdots r_{n,1,L_R,L}],$$

$$r_{n,r}=[r_{n,r,k^*,1}\cdots r_{n,r,k^*,L/2}],r\in\{2,3,\ldots,\log_2 M+1\}.$$

Since the matched filtering output of the receiving signal has a large dynamic range and is a complex signal, it is not suitable for direct input, so the receiving signals of multiple rounds are normalized according to each round and then combined:

$$r_{n,r}^N = \frac{r_{n,r}}{\|r_{n,r}\|_\infty},$$

$$r_n^N = [r_{n,1}^N, \ldots, r_{n,1+\log_2 M}^N],$$

and the real and imaginary parts of the normalized signals are taken as two feature inputs of a designed neural network. In addition, the receiving wide beam k* at the UE also has a great influence on the prediction of its narrow beam, so it is also taken as a feature input:

$$y_n=[\text{Re}(r_n^N),\text{Im}(r_n^N),k^*].$$

That is, the tag is the real optimal sending beam direction of the UE. In an embodiment of the present disclosure, the training data at different signal-to-noise ratios are obtained by changing the total training overhead $E_{tot}$.

Further, the offline training is performed on the preset convolutional neural network via the acquired training data, that is, a data-driven convolution neural network structure and set network parameters are set, and the generated training data is used to perform the offline training on the network, to obtain the trained network parameters.

As an example, a body of the convolutional neural network set in the present disclosure consists of three modules: a preprocessing module, a convolution module, and an output module. In the training process, data at different signal-to-noise ratios are mixed for training. When a loss function no longer drops, that is, the prediction accuracy of a verification set no longer improves, the training stops, and a training model is saved, thus completing the training process offline.

In step S105, online real-time signal detection is performed based on the trained network parameters and the receiving signals at the UE to predict a target uplink sending narrow beam from the UE to the base station In some embodiment, the present disclosure saves the trained network parameters for the online real-time signal detection, and the online real-time signal detection is performed according to the receiving signal of the UE, that is, the observation signal received by the UE in the downlink beam training, so as to predict the uplink sending narrow beam.

In step S106, the UE is controlled to feedback an index of a target downlink sending narrow beam at the base station to the base station, and the target downlink sending narrow beam is widen into a target uplink receiving beam at the base station.

It is to be noted that, due to asymmetric natures of the uplink and downlink beam at the base station, the downlink sending beam is narrower than the uplink receiving beam at the base station, and the optimal sending beam at the base station may already be determined in the above-mentioned step S103. Therefore, the present disclosure uses the partial reciprocity of the uplink and downlink beam domains to widen the downlink sending beam of the base station to generate the uplink receiving wide beam.

In a specific implementation, as an example, after the UE feeds back the index of the target downlink sending narrow beam to the base station, a central angle of the target uplink receiving beam at the base station is kept consistent with the target downlink sending narrow beam based on the asymmetric nature of uplink and downlink beams, and a width of the target uplink receiving beam at the base station is widen to a preset beam width. Thus realizing the generation of the target uplink receiving beam at the base station.

To sum up, the multi-user uplink and downlink beam alignment method for asymmetric millimeter wave large-scale multiple-input multiple-output (MIMO) in the embodiment of the present disclosure uses an all-digital multi-directional beam to perform beam training for multi-user simultaneously, and completes the beam alignment between a base station and the multi-user with less training overhead and higher reliability, thus overcoming the disadvantages of high overhead and low reliability of the traditional method for the downlink. For the uplink, with the help of a deep learning method, an optimal sending narrow beam of an uplink user equipment (UE) is inferred directly from an observation signal of downlink training without consuming additional training overhead, and a downlink sending beam of the base station is widen to generate an uplink receiving wide beam by using the partial reciprocity of uplink and downlink beam domains, thus completing the selection or generation of the uplink receiving and sending beams, reducing the training overhead and simplifying the training process. Overall, this method may achieve better spectrum efficiency and ensure an uplink transmission rate of an asymmetric system without additional overhead.

In order to more clearly explain the specific implementation process of the multi-user uplink and downlink beam alignment method for asymmetric millimeter wave large-scale multiple-input multiple-output (MIMO) according to the embodiment of the present disclosure, the following description will be made in combination with implementation modes in several scenarios in practical applications.

Figure 3:
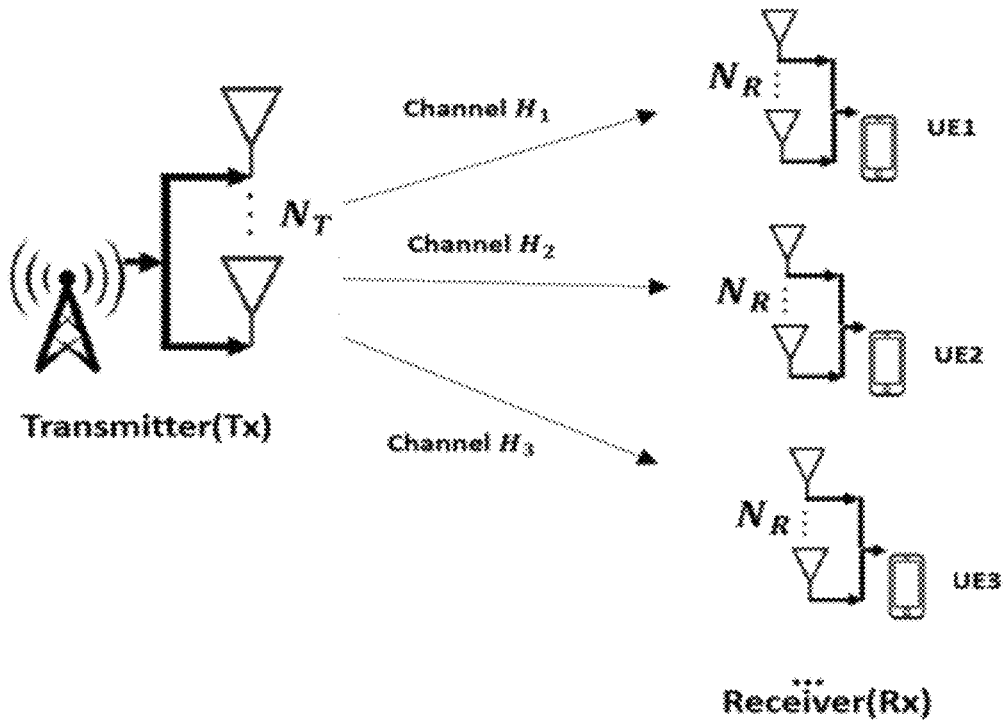
FIG. 3 is a schematic diagram showing an application scenario of a multi-user uplink and downlink beam alignment method for asymmetric millimeter wave large-scale multiple-input multiple-output (MIMO) provided by an embodiment of the present disclosure.

FIG. 3 is a schematic diagram showing an application scenario of a multi-user uplink and downlink beam alignment method for asymmetric millimeter wave large-scale multiple-input multiple-output (MIMO) provided by an embodiment of the present disclosure. Tx is a signal transmitter, for example, it may be a base station. Rx is a receiver, which may include a plurality of user equipments (UEs). The Tx transmits a receiver corresponding to a signal value via a plurality of channels. Considering the typical scenario of millimeter wave outdoor mobile communication, one base station covers N users, and the base station is equipped with $N_T$ antennas, each antenna has an independent radio frequency link, and the UEs are $N_R$ antennas. When performing downlink transmission, a size of the codebook sent by the base station is $L_T$, and a size of the codebook received by the UE is $L_R$. When performing uplink transmission, a size of the codebook received by the base station is $L_R'$ and a size of the codebook sent by the UE is $L_T'$ (there are $L_T > L_R'$, $L_T' > L_R$ according to the characteristics of an asymmetric millimeter wave large-scale multiple-input multiple-output (MIMO) system).

For example, consider an asymmetric millimeter wave communication system operating at 73 GHz with a coherence bandwidth of 100 MHz. One base station covers N={2,4,8} users. The base station is equipped with 64 antennas, each antenna has an independent radio frequency link, and the UE has 8 antennas.

Figure 2:
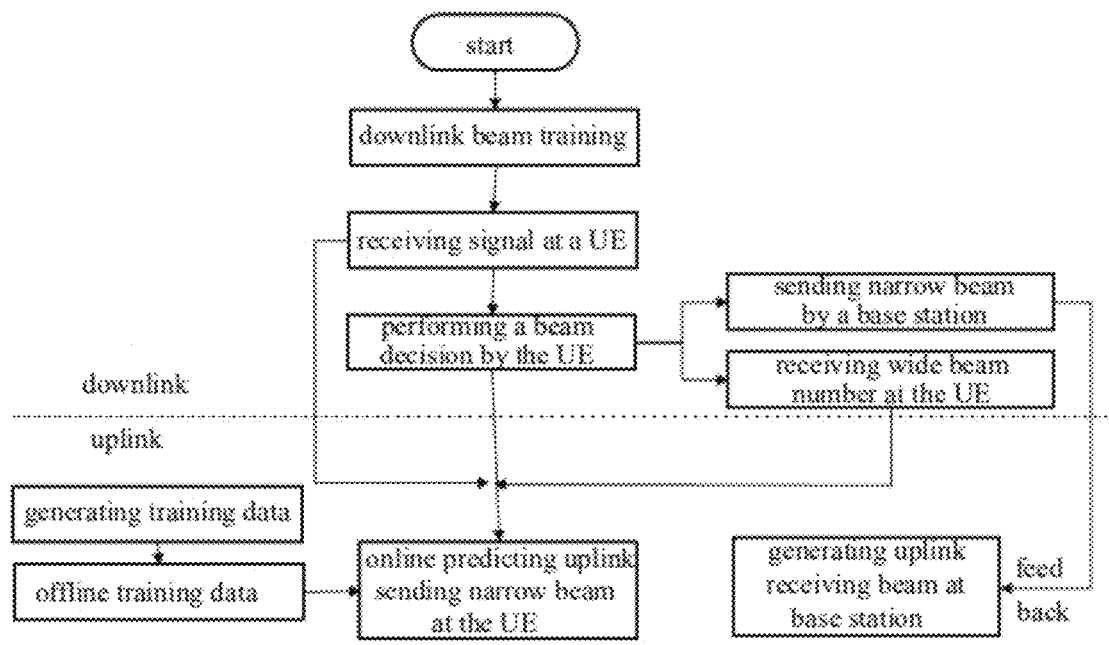
FIG. 2 is a flow chart showing a specific multi-user uplink and downlink beam alignment method for asymmetric millimeter wave large-scale multiple-input multiple-output (MIMO) provided by an embodiment of the present disclosure.

The present disclosure puts forward two example scenarios. ① When performing downlink transmission, the base station uses 64 antennas, a size of a sending codebook is 32, and the UE uses 4 antennas, and a size of a receiving codebook is 4. When performing uplink transmission, the base station uses 16 antennas, a size of a receiving codebook is 16, and the UE uses 8 antennas, and a size of a sending codebook is 8. ② When performing downlink transmission, the base station uses 64 antennas, a size of a sending codebook is 32, and the UE uses 8 antennas, and a size of a receiving codebook is 4. When performing uplink transmission, the base station uses 64 antennas, a size of a receiving codebook is 16, and the UE uses 8 antennas, and a size of a sending codebook is 8. When beam alignment is performed with regard to the system, the present disclosure provides a specific multi-user uplink and downlink beam alignment method for asymmetric millimeter wave large-scale multiple-input multiple-output (MIMO). As shown in FIG. 2, the method includes the following steps.

(1) Downlink beam training from the base station to the UE:

(1.1) Constructing a multi-directional beam codebook:

$\tilde{w}(j)$ represents an optimized codeword transmitted in a direction $\alpha(j)$, and a multi-directional beam simultaneously detected in four directions (assuming M[1], M[2], ..., M[4]) is constructed as follows:

$$[w_1(M[1]), w_2(M[2]), \ldots, w_M(M[4])] = \frac{[\tilde{w}(M[1]) + \tilde{w}(M[2]) + \ldots + \tilde{w}(M[4])]}{\|\tilde{w}(M[1]) + \tilde{w}(M[2]) + \ldots + \tilde{w}(M[4])\|_2}.$$

(1.2) Downlink beam training:

Channel modeling: Millimeter wave channels are modeled with a limited number of multipath components (from different AoA and AoD) based on measurements in existing literature. In a line-of-sight scenario, the channel is modeled as a Ricean channel with one main path, and a Ricean factor is set to 13.2 dB.

Figure 4:
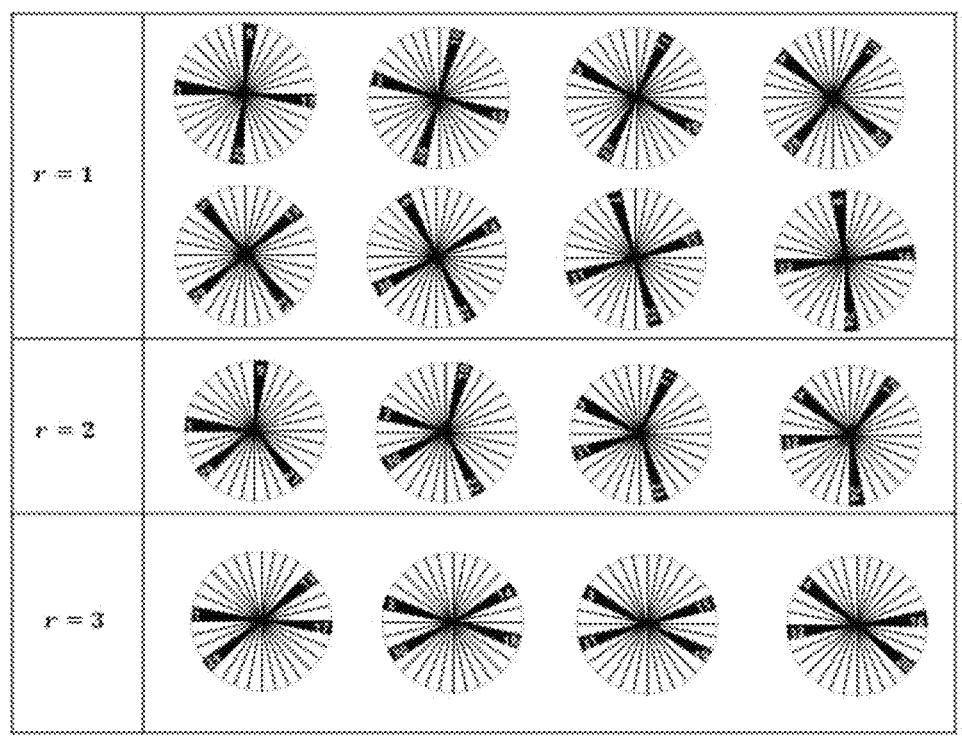
FIG. 4 is a schematic diagram showing beam training provided by an embodiment of the present disclosure.

Since each multi-directional beam detects M=4 directions simultaneously, a total of $1+\log_2 M=3$ rounds are needed (a multi-beam coverage direction of each round is shown in FIG. 4), and the proportion of training overhead per round was {0.65, 0.175, 0.175}, respectively.

1) r=1: the first round of base station scanning the whole space needs to perform $L=L_T/M=8$ observations, and a $l^{th}$ multi-directional beam coverage direction set is $G(1,l)=\{l, l+8, \ldots, l+24\}$, $\forall l \in \{1,2,\ldots,8\}$ (as shown in FIG. 3), and the UE needs to scan 4 directions, and therefore a total of $L*L_R=32$ observations needs to be performed, and the matched filtering output of each observation is:

$$r_{n,1,k,l} = K_1 E_{tot} h_{n,1,k,l}/(L^*L_R) + z_{n,1,k,l},$$

selecting the beam pair with the optimal ($|r_{n,1,k,l}|$ largest), in which the corresponding base station thereof is a candidate set of the optimal sending beam, and the corresponding UE is the optimal receiving beam.

2) r=2: the second round of base station sending beam directions recombines the first round of multi-directional beam directions, and a $l^{th}$ multi-directional beam coverage direction set is $G(2, l)=\{[G(1,l)]_{1:2}, [G(1,l+4)]_{3:4}\}$, $\forall l \in \{1,2,\ldots,4\}$ (as shown in FIG. 3), only needing to observe four times, covering half of the departure angle space, and the UE using the optimal narrow beam decided by the first round to receive.

3) r=3: the third round of base station sending beam directions are also obtained by recombining the first round of multi-directional beam directions, and a $l^{th}$ multi-directional beam coverage direction set is $G(3, l)=\{[G(1,l)]_1, [G(1,l+4)]_2, [G(1,l)]_3, [G(1, l+4)]_4\}$, $\forall l \in \{1, 2, \ldots, 4\}$ (as in FIG. 3), observing four times as in the second round, covering half of the departure angle space, that is to say, the UE using the optimal narrow beam decided by the first round to receive.

(1.3) Beam decision:

Each user may independently determine its optimal beam pair according to its receiving power in the downlink training process after beam training.

1) r=1:

$$P_n(1,k,l) = \|r_{n,1,k,l}\|^2,$$

the sending-receiving beam pair with the maximum receiving power is selected:

$$(l_n^*(1), k^*) = \arg\max_{k \in \{1,2,\ldots,L_R\}, l \in \{1,2,\ldots,L\}} P_n(1,k,l),$$

$k^*$ represents the optimal receiving beam at the UE, and $l_n^*(1)$ represents a multi-beam combination of the maximum power after the first round of beam scanning.

A candidate direction set of the optimal beam direction after the first round of beam scanning is:

$$\hat{A}_n(1) = G_n(1, l_n^*(1)),$$

where the definition $l_n(r) = \{l \in \{1,2, \ldots, L/2\} | G_n(r,l) \cap A(1) \neq \emptyset\}$ indicates a combination having a common direction with $\hat{A}_n(1)$. The expected receiving power corresponding to the multiple beams from the covered/uncovered optimal direction is approximately $P_n(1, k^*, l_n^*)$ and 0, respectively (ignoring receiver noise and inter-beam interference). A binary decision threshold for judging whether $G_n(r, l_n(r))$ contains receiving power of the optimal beam direction is:

$$P_n^* = p(P_n(1,k^*,l_n)+0) = p\|r_{n,1,k^*,l_n^*}\|^2, p \in (0,1).$$

2) r=2: combining the binary decision with $\hat{A}_n(1)$, the user n may determine a following new round candidate direction:

$$\hat{A}_n(2) = \begin{cases} \hat{A}_n(1) \cap G_n(2, l_n(r)), & \text{if } P_n(2, k^*, l) \geq P_n^* \\ \hat{A}_n(1) \backslash G_n(2, l_n(r)), & \text{if } P_n(2, k^*, l) < P_n^* \end{cases}, \forall n \in N.$$

3) r=3: combining the binary decision with $\hat{A}_n(2)$, the user n may finally determine the optimal sending beam direction of the optimal base station:

$$\hat{A}_n(2) = \begin{cases} \hat{A}_n(2) \cap G_n(3, l_n(r)), & \text{if } P_n(3, k^*, l) \geq P_n^* \\ \hat{A}_n(2) \backslash G_n(3, l_n(r)), & \text{if } P_n(3, k^*, l) < P_n^* \end{cases}, \forall n \in N.$$

(2) Predicting the uplink sending narrow beam from the UE to the base station:

(2.1) Generating the training data:

Combining the matched filtering output of the receiving signal of the $r^{th}$ round of the user n into:

$$r_{n,1} = [r_{n,1,1,1} \cdots r_{n,1,1,L}, r_{n,1,2,1} \cdots r_{n,1,L_R,L}],$$

$$r_{n,r} = [r_{n,r,k^*,1} \cdots r_{n,r,k^*,L/2}], r \in \{2,3\}.$$

Since the matched filtering output of the receiving signal has a large dynamic range and is a complex signal, it is not suitable for direct input, so the receiving signals of multiple rounds are normalized according to each round and then combined:

$$r_{n,r}^N = \frac{r_{n,r}}{\|r_{n,r}\|_\infty},$$

$$r_n^N = [r_{n,1}^N, r_{n,2}^N, r_{n,3}^N],$$

and the real and imaginary parts of the normalized signals are taken as two feature inputs of a designed neural network. In addition, the receiving wide beam $k^*$ at the UE also has a great influence on the prediction of its narrow beam, so it is also taken as a feature input:

$$y_n = [\text{Re}(r_n^N), \text{Im}(r_n^N), k^*].$$

That is, the tag is the real optimal sending beam direction of the UE. Change the signal-to-noise ratio $E_{tot}$. A training set collects 200000 sets of data at each signal-to-noise ratio of 11 dB to 16 dB, and a verification set collects 20000 sets of data at each signal-to-noise ratio.

(2.2) Setting and training of network parameters:

A body of network consists of three modules: a preprocessing module, a convolution module, and an output module. The convolution module consists of four convolution layers and four ReLU activation layers alternately, and finally a pool layer is connected. The output module consists of all connection layers and Softmax. The data at different signal-to-noise ratios are mixed for training, and an Adam optimizer is used to optimize model parameters. When a loss function no longer drops (the prediction accuracy of a verification set no longer improves), the training stops, and a training model is saved, thus completing the training process offline.

(2.3) Online detection:

The trained network parameters are saved for online real-time signal detection, and online real-time signal detection is performed according to the receiving signal of the UE, so as to predict the uplink sending narrow beam.

(3) Generation of uplink receiving beam at the base station:

Due to the asymmetric nature of the uplink and downlink beams at the base station (the downlink sending beam is narrower than the uplink receiving beam at the base station), the optimal sending beam at the base station may already be determined from the previous step (1). After the UE feeds this information back to the base station, the base station keeps the central angle of the receiving wide beam consistent with that of the sending narrow beam, and the width may be directly widened to a corresponding beam width.

In order to more clearly illustrate the technical effect of the multi-user uplink and downlink beam alignment method for asymmetric millimeter wave large-scale multiple-input multiple-output (MIMO) provided in the present disclosure, the present disclosure also determines performance curves in the above-mentioned two example scenarios.

Figure 5:
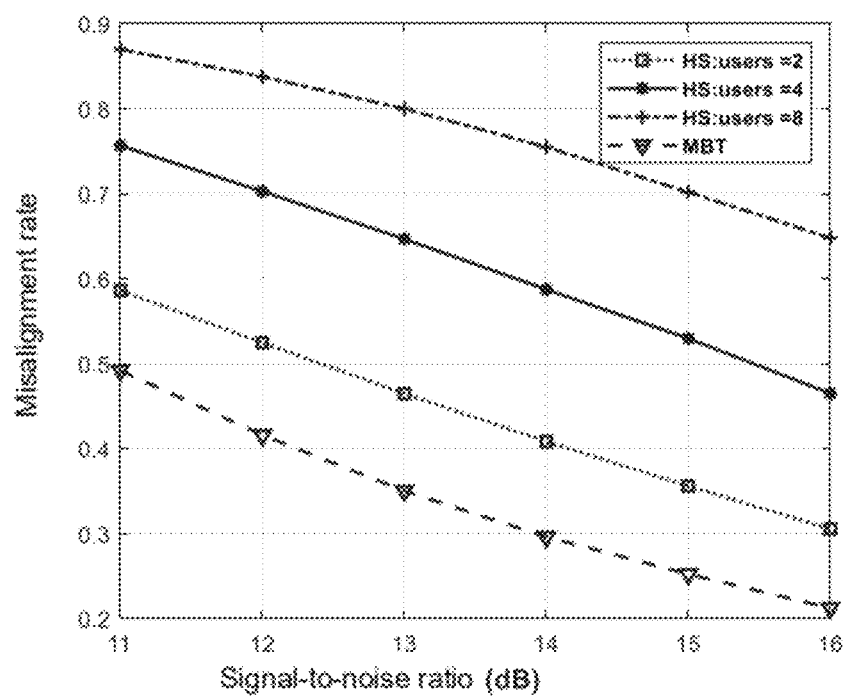
FIG. 5 is a schematic diagram showing a performance curve of a downlink beam training misalignment rate provided by an embodiment of the present disclosure.
Figure 6:
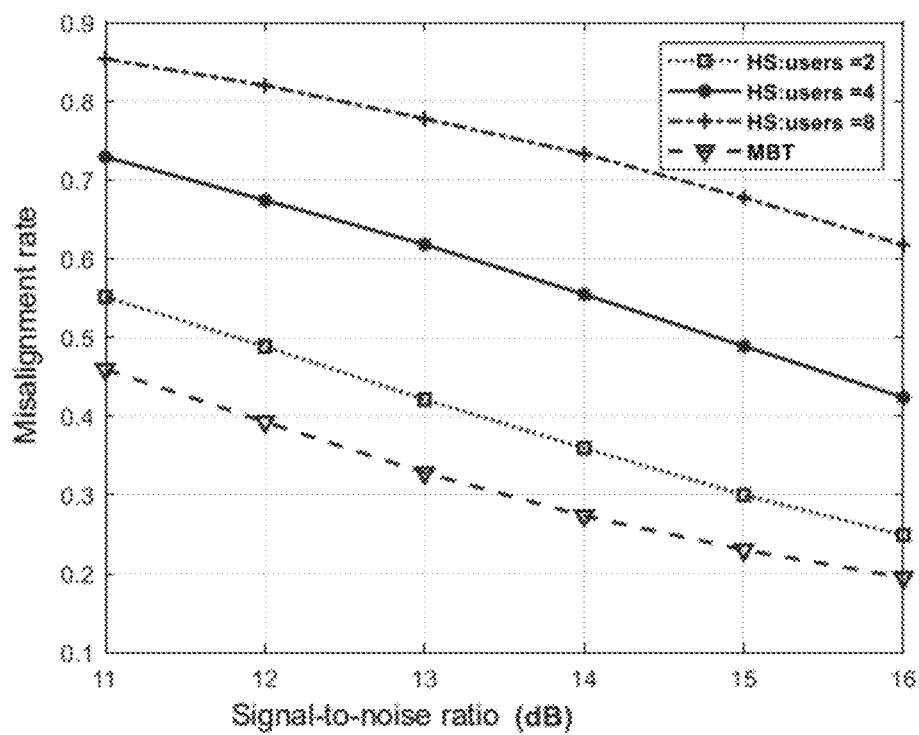
FIG. 6 is a schematic diagram showing another performance curve of a downlink beam training misalignment rate provided by an embodiment of the present disclosure.

FIG. 5 and FIG. 6 are the performance curves of a downlink beam training misalignment rate of example scenario ① and example scenario ②, respectively. It may be concluded from FIG. 5 and FIG. 6 that the performance of the training solution (MBT) of the present disclosure is better than that of a baseline algorithm hierarchical search (HS) in both two example scenarios, and the performance of the hierarchical search will further deteriorate as the number of users increases.

Figure 7:
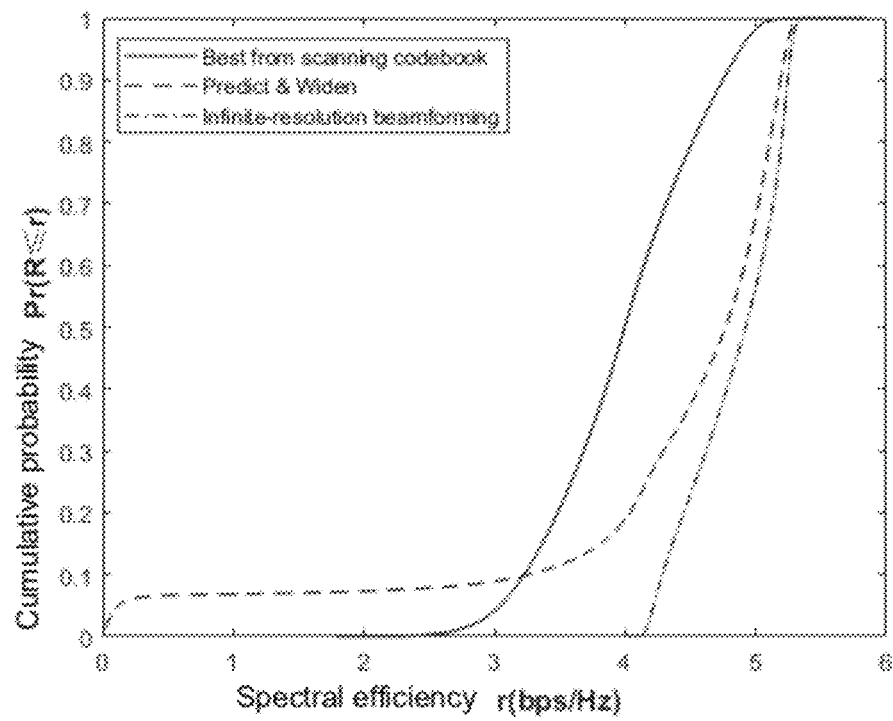
FIG. 7 is a schematic diagram showing a cumulative distribution function (CDF) performance curve of achievable spectral efficiency for uplink transmission provided by an embodiment of the present disclosure.
Figure 8:
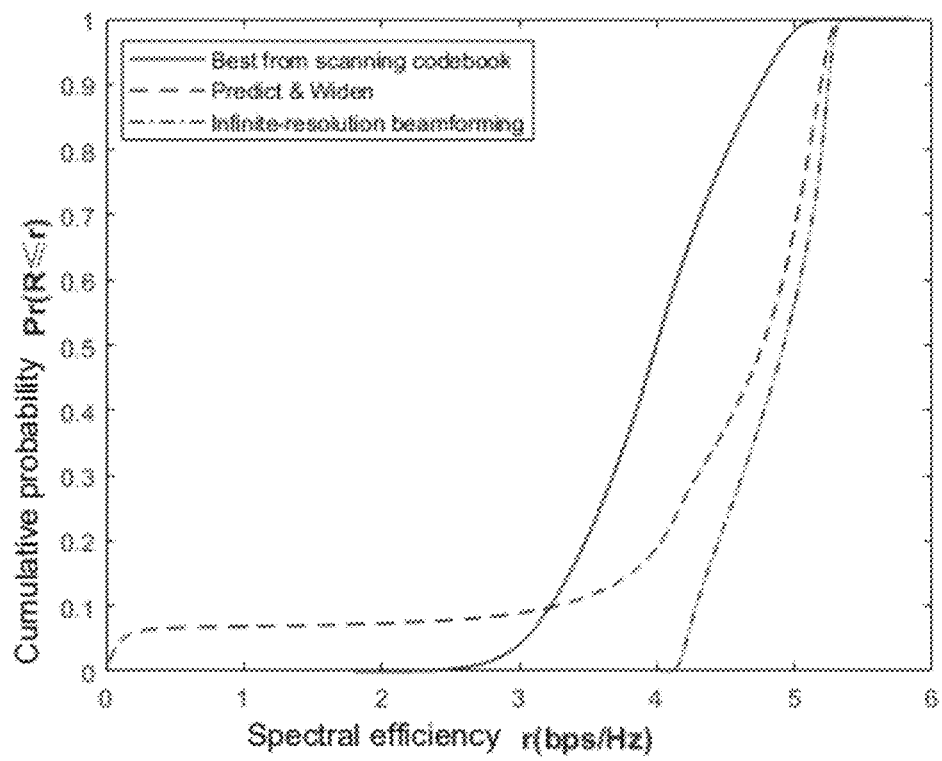
FIG. 8 is a schematic diagram showing another CDF performance curve of achievable spectral efficiency for uplink transmission provided by an embodiment of the present disclosure.

FIG. 7 and FIG. 8 are CDF performance curves of achievable spectral efficiency for uplink transmission of example scenario ① and example scenario ②, respectively. From FIG. 7 and FIG. 8, it may be concluded that the neural network provided in the present disclosure predicts that the uplink sending narrow beam and the receiving wide beam obtained by widening may achieve better spectral efficiency, and may ensure the uplink transmission rate of the asymmetric system without additional overhead.

Figure 9:
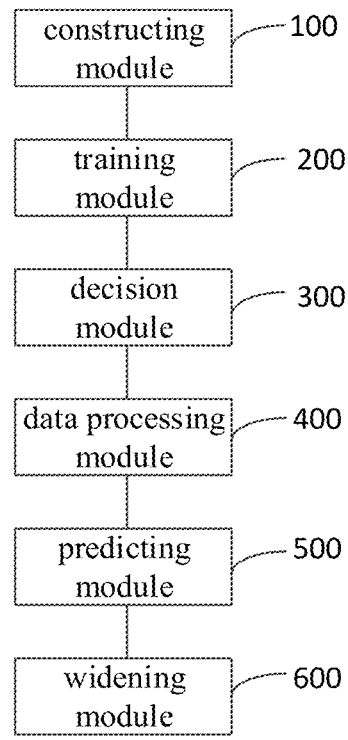
FIG. 9 is a structural schematic diagram showing a multi-user uplink and downlink beam alignment apparatus for asymmetric millimeter wave large-scale multiple-input multiple-output (MIMO) provided by an embodiment of the present disclosure.

In order to realize the above-mentioned embodiment, the present disclosure also provides a multi-user uplink and downlink beam alignment apparatus for asymmetric millimeter wave large-scale multiple-input multiple-output (MIMO). FIG. 9 is a structural schematic diagram showing a multi-user uplink and downlink beam alignment apparatus for asymmetric millimeter wave large-scale multiple-input multiple-output (MIMO) provided by an embodiment of the present disclosure. As shown in FIG. 9, this apparatus includes a constructing module 100, a training module 200, a decision module 300, a data processing module 400, a predicting module 500, and a widening module 600.

The constructing module 100 is configured to construct a multi-directional beam codebook, and construct an all-digital multi-directional beam for multiple-direction probing through optimized codewords in the codebook.

The training module 200 is configured to control a base station to send the multi-directional beam, control a UE to receive the multi-directional beam by using a receiving beam, and determine a matched filtering output of receiving signals at the UE for multiple rounds of downlink beam training from the base station to the UE.

The decision module 300 is configured to control the UE to perform a beam decision according to the receiving signals, and determine a target downlink sending-receiving beam pair with maximum receiving power from the receiving signals received in the multiple rounds of downlink beam training.

The data processing module 400 is configured to perform data processing on the receiving signals at different signal-to-noise ratios received by the UE to generate training data for predicting an uplink sending narrow beam from the UE to the base station, and perform offline training on a preset convolutional neural network via the training data to obtain trained network parameters.

The predicting module 500 is configured to perform online real-time signal detection based on the trained network parameters and the receiving signals at the UE to predict a target uplink sending narrow beam from the UE to the base station.

The widening module 600 is configured to control the UE to feedback an index of a target downlink sending narrow beam at the base station to the base station, and widen the target downlink sending narrow beam into a target uplink receiving beam at the base station.

Alternatively, in an embodiment of the present disclosure, the constructing module 100 is configured to construct a minimum mean square error function for optimizing the multi-directional beam; and solve the minimum mean square error function by a Riemannian manifold optimization algorithm to obtain optimized codewords transmitted in different directions, and combine the codewords to generate the codebook.

Alternatively, in an embodiment of the present disclosure, the constructing module 100 is configured to express the minimum mean square error function by:

$$\min f(w) = \left\| U^H w \odot (U^H w)^* - g \odot g^* \right\|_2^2$$

$$\text{s.t. } w^H w = 1, g = \begin{cases} W, & \text{if } \emptyset \in \emptyset_{w_i} \\ 0, & \text{else} \end{cases}$$

where w represents a unidirectional beam, $U=[u(\emptyset^1, L_T), \ldots, u(\emptyset^N, L_T)]$, $u(\emptyset^n, L_T)$ represents an array response vector, $\emptyset^n$ represents a departure angle, $\odot$ represents hadmard product, g represents an ideal gain vector, $L_T$ represents a size of the codebook sent by the base station in downlink transmission, and g* represents an element-wise conjugate of the ideal gain vector; and the all-digital multi-directional beam for multiple-direction probing is constructed by:

$$[w_1(M[1]), w_2(M[2]), \ldots, w_M(M[M])] = \frac{[\tilde{w}(M[1]) + \tilde{w}(M[2]) + \ldots + \tilde{w}(M[M])]}{\|\tilde{w}(M[1]) + \tilde{w}(M[2]) + \ldots + \tilde{w}(M[M])\|_2}$$

where M[·] represents a direction of the multi-directional beam, M represents the number of directions of the multi-directional beam, and $\tilde{w}(\cdot)$ represents an optimized codeword transmitted in any direction.

Alternatively, in an embodiment of the present disclosure, the training module 200 is further configured to control the base station to send a preset number of pilot sequences in each round of downlink beam training; determine a combined signal corresponding to any training symbol in a current round of downlink beam training received by the UE; and determine a matched filtering output of the combined signal corresponding to the training symbol.

Alternatively, in an embodiment of the present disclosure, the data processing module 400 is further configured to combine the matched filtering output of the receiving signals at different signal-to-noise ratios received by the UE by:

$$r_{n,r} = [r_{n,r,k^*,1} \cdots r_{n,r,k^*,L/2}], r \in \{2, 3, \ldots, \log_2 M + 1\},$$

where $r_{n,1} = [r_{n,1,1,1} \cdots r_{n,1,1,L}, r_{n,1,2,1} \cdots r_{n,1,L_R,L}]$, r represents a training round, n represents any user, k* represents a receiving beam of the UE, $L_R$ represents a size of a receiving codebook at the UE, $L = L_T/M$, and $L_T$ represents a size of a sending codebook at the base station; successively normalize the receiving signals from individual rounds of downlink beam training and combine normalized signals; and take real and imaginary parts of the normalized signals and the receiving beam at the UE as the training data.

Alternatively, in an embodiment of the present disclosure, the widening module 600 is configured to keep a central angle of the target uplink receiving beam at the base station consistent with the target downlink sending narrow beam based on the asymmetric nature of uplink and downlink beams, and widen a width of the target uplink receiving beam at the base station to a preset beam width.

To sum up, the multi-user uplink and downlink beam alignment apparatus for asymmetric millimeter wave large-scale multiple-input multiple-output (MIMO) in the embodiment of the present disclosure uses an all-digital multi-directional beam to perform beam training for multi-user simultaneously, and completes the beam alignment between a base station and the multi-user with less training overhead and higher reliability, thus overcoming the disadvantages of high overhead and low reliability of the traditional method for the downlink. For the uplink, with the help of a deep learning method, an optimal sending narrow beam of an uplink user equipment (UE) is inferred directly from an observation signal of downlink training without consuming additional training overhead, and a downlink sending beam of the base station is widen to generate an uplink receiving wide beam by using the partial reciprocity of uplink and downlink beam domains, thus completing the selection or generation of the uplink receiving and sending beams, reducing the training overhead and simplifying the training process. Overall, this method may achieve better spectrum efficiency and ensure an uplink transmission rate of an asymmetric system without additional overhead.

In order to realize the above embodiments, the present disclosure also provides a non-transitory computer-readable storage medium having stored therein computer instructions that, when executed by a processor, cause the multi-user uplink and downlink beam alignment method for asymmetric millimeter wave large-scale multiple-input multiple-output (MIMO) described in any of the above-mentioned embodiments to be implemented.

The embodiment of the present disclosure also provides a multi-user uplink and downlink beam alignment device for asymmetric millimeter wave large-scale multiple-input multiple-output (MIMO) including a processor; and a memory communicatively connected with the processor; in which the memory stores instructions executable by the processor that, when executed by the processor, cause the processor to perform the multi-user uplink and downlink beam alignment method for asymmetric millimeter wave large-scale multiple-input multiple-output (MIMO) described in the above-mentioned embodiments.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The schematic expressions of the above-mentioned terms throughout this specification are not necessarily referring to the same embodiment or example of the present disclosure. Furthermore, the particular features, structures, materials, or characteristics described may be combined in any suitable manner in one or more embodiments or examples. In addition, those skilled in the art may combine the different embodiments or examples and the features described in this specification without being mutually inconsistent.

In addition, terms "first" and "second" are used herein for purposes of description and are not intended to indicate or imply relative importance or significance or to imply the number of indicated technical features. Thus, the feature defined with "first" and "second" may include at least one of these features explicitly or implicitly. In the description of the present disclosure, "a plurality of" means at least two, such as two, three, etc., unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which functions may be performed out of the order shown or discussed, including in a substantially simultaneous manner or in a reverse order according to the functions involved, which should be understood by those skilled in the art to which the embodiments of the present disclosure belong.

The logic and/or step shown in the flow chart or described in other manners herein, for example, a particular sequence table of executable instructions for realizing the logical function, may be specifically achieved in any computer readable medium to be used by the instruction execution system, apparatuses, or devices (such as the system based on computers, the system comprising processors or other systems capable of obtaining the instruction from the instruction execution system, device, or equipment and executing the instruction), or to be used in combination with the instruction execution system, device, or equipment. As to the specification, the "computer readable medium" may be any device adaptive for including, storing, communicating, propagating or transferring programs to be used by or in combination with the instruction execution system, device, or equipment. More specific examples (a non-exhaustive list) of the computer-readable medium include the following: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above-mentioned embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs, when executed, comprise one or a combination of the steps in the method embodiments.

In addition, each function cell of the embodiments of the present disclosure may be integrated in a processing module, or these cells may be separate physical existence, or two or more cells are integrated in a processing module. The above-mentioned integrated module may be realized in a form of hardware or in a form of software function modules. When the integrated module is realized in a form of software function module and is sold or used as a standalone product, the integrated module may be stored in a computer readable storage medium.

The storage medium mentioned above may be read only memories, magnetic disks, optical disks, etc. Although the embodiments of the present disclosure have been shown and described above, it would be appreciated by those skilled in the art that the above embodiments are illustrative, and cannot be construed to limit the present disclosure, and changes, modifications, substitutions, and variations may be made in the embodiments without departing from scope of the present disclosure.

What is claimed is:

1. A multi-user uplink and downlink beam alignment method for asymmetric millimeter wave large-scale multiple-input multiple-output (MIMO), comprising:
   constructing a multi-directional beam codebook, and constructing an all-digital multi-directional beam for multiple-direction probing through optimized codewords in the codebook;
   controlling a base station to send the multi-directional beam, controlling a user equipment (UE) to receive the multi-directional beam by using a receiving beam, and determining a matched filtering output of receiving signals at the UE for multiple rounds of downlink beam training from the base station to the UE;
   controlling the UE to perform a beam decision according to the receiving signals, and determining a target downlink sending-receiving beam pair with maximum receiving power from the receiving signals received in the multiple rounds of downlink beam training;
   performing data processing on the receiving signals at different signal-to-noise ratios received by the UE to generate training data for predicting an uplink sending narrow beam from the UE to the base station, and performing offline training on a preset convolutional neural network via the training data to obtain trained network parameters;
   performing online real-time signal detection based on the trained network parameters and the receiving signals at the UE to predict a target uplink sending narrow beam from the UE to the base station; and
   controlling the UE to feedback an index of a target downlink sending narrow beam at the base station to the base station, and widening the target downlink sending narrow beam into a target uplink receiving beam at the base station.

2. The alignment method of claim 1, wherein constructing the multi-directional beam codebook comprises:
   constructing a minimum mean square error function for optimizing the multi-directional beam; and
   solving the minimum mean square error function by a Riemannian manifold optimization algorithm to obtain optimized codewords transmitted in different directions, and combining the codewords to generate the codebook.

3. The alignment method of claim 2, wherein the minimum mean square error function is expressed by:

$$\min f(w) = \left\| U^H w \odot (U^H w)^* - g \odot g^* \right\|_2^2$$

$$\text{s.t. } w^H w = 1, g = \begin{cases} W, & \text{if } \emptyset \in \emptyset_{w_i} \\ 0, & \text{else} \end{cases}$$

where w represents a unidirectional beam, $U=[u(\emptyset^1, L_T), \ldots, u(\emptyset^N, L_T)]$, $u(\emptyset^n, L_T)$ represents an array response vector, $\emptyset^n$ represents a departure angle, $\odot$ represents Hadmard product, g represents an ideal gain vector, $L_T$ represents a size of the codebook sent by the base station in downlink transmission, H represents a conjugate transpose operation, and $g^*$ represents an element-wise conjugate of the ideal gain vector; and the all-digital multi-directional beam for multiple-direction probing is constructed by:

$$[w_1(M[1]), w_2(M[2]), \ldots, w_M(M[M])] = \frac{[\tilde{w}(M[1]) + \tilde{w}(M[2]) + \ldots + \tilde{w}(M[M])]}{\|\tilde{w}(M[1]) + \tilde{w}(M[2]) + \ldots + \tilde{w}(M[M])\|_2}$$

where $M[\cdot]$ represents a direction of the multi-directional beam, M represents a number of directions of the multi-directional beam, and $\tilde{w}(\square)$ represents an optimized codeword transmitted in any direction.

4. The alignment method of claim 3, wherein the base station sends a plurality of training symbols and determines a combination of directions for collecting observation signals in any training symbol in each round of downlink beam training from the base station to the UE, and the multiple rounds of downlink beam training from the base station to the UE comprises:
   sending, by the base station, a preset number of pilot sequences in each round of downlink beam training;
   determining a combined signal corresponding to any training symbol in a current round of downlink beam training received by the UE; and determining a matched filtering output of the combined signal corresponding to the training symbol.

5. The alignment method of claim 4, wherein performing data processing on the receiving signals at different signal-to-noise ratios received by the UE to generate training data for predicting the uplink sending narrow beam from the UE to the base station comprises:

combining the matched filtering output of the receiving signals at different signal-to-noise ratios received by the UE by:

$$r_{n,r}=[r_{n,r,k^*,1}\cdots r_{n,r,k^*,L/2}], r\in\{2,3,\ldots,\log_2 M+1\},$$

where $r_{n,1}=[r_{n,1,1,1}\cdots r_{n,1,1,L}, r_{n,1,2,1}\cdots r_{n,1,L_R,L}]$, r represents a training round, n represents any user, k* represents a receiving beam of the UE, $L_R$ represents a size of a receiving codebook at the UE, $L=L_T/M$, and $L_T$ represents a size of a sending codebook at the base station;

successively normalizing the receiving signals from individual rounds of downlink beam training and combining normalized signals; and taking real and imaginary parts of the normalized signals and the receiving beam at the UE as the training data.

6. The alignment method of claim 5, wherein widening the target downlink sending narrow beam into the target uplink receiving beam at the base station comprises:

keeping a central angle of the target uplink receiving beam at the base station consistent with the target downlink sending narrow beam based on the asymmetric nature of uplink and downlink beams, and widening a width of the target uplink receiving beam at the base station to a preset beam width.

7. A multi-user uplink and downlink beam alignment device for asymmetric millimeter wave large-scale multiple-input multiple-output (MIMO), comprising:

a processor; and a memory communicatively connected with the processor;

wherein the memory stores instructions executable by the processor that, when executed by the processor, cause the processor to:

construct a multi-directional beam codebook, and construct an all-digital multi-directional beam for multiple-direction probing through optimized codewords in the codebook;

control a base station to send the multi-directional beam, control a user equipment (UE) to receive the multi-directional beam by using a receiving beam, and determine a matched filtering output of receiving signals at the UE for multiple rounds of downlink beam training from the base station to the UE;

control the UE to perform a beam decision according to the receiving signals, and determine a target downlink sending-receiving beam pair with maximum receiving power from the receiving signals received in the multiple rounds of downlink beam training;

perform data processing on the receiving signals at different signal-to-noise ratios received by the UE to generate training data for predicting an uplink sending narrow beam from the UE to the base station, and perform offline training on a preset convolutional neural network via the training data to obtain trained network parameters;

perform online real-time signal detection based on the trained network parameters and the receiving signals at the UE to predict a target uplink sending narrow beam from the UE to the base station; and control the UE to feedback an index of a target downlink sending narrow beam at the base station to the base station, and widen the target downlink sending narrow beam into a target uplink receiving beam at the base station.

8. The alignment device of claim 7, wherein the processor is configured to:

construct a minimum mean square error function for optimizing the multi-directional beam; and solve the minimum mean square error function by a Riemannian manifold optimization algorithm to obtain optimized codewords transmitted in different directions, and combine the codewords to generate the codebook.

9. The alignment device of claim 8, wherein the minimum mean square error function is expressed by:

$$\min f(w) = \left\| U^H w \odot (U^H w)^* - g \odot g^* \right\|_2^2$$

$$\text{s.t. } w^H w = 1, g = \begin{cases} W, & \text{if } \emptyset \in \emptyset_{w_i} \\ 0, & \text{else} \end{cases}$$

where w represents a unidirectional beam, $U=[u(\emptyset^1, L_T), \ldots, u(\emptyset^N, L_T)]$, $u(\emptyset^n L_T)$ represents an array response vector, $\emptyset^n$ represents a departure angle, $\odot$ represents Hadmard product, g represents an ideal gain vector, $L_T$ represents a size of the codebook sent by the base station in downlink transmission, H represents a conjugate transpose operation, and g* represents an element-wise conjugate of the ideal gain vector; and the all-digital multi-directional beam for multiple-direction probing is constructed by:

$$[w_1(M[1]), w_2(M[2]), \ldots, w_M(M[M])] = \frac{[\tilde{w}(M[1]) + \tilde{w}(M[2]) + \ldots + \tilde{w}(M[M])]}{\|\tilde{w}(M[1]) + \tilde{w}(M[2]) + \ldots + \tilde{w}(M[M])\|_2}$$

where $M[\cdot]$ represents a direction of the multi-directional beam, M represents a number of directions of the multi-directional beam, and $\tilde{w}(\cdot)$ represents an optimized codeword transmitted in any direction.

10. The alignment device of claim 9, wherein the processor is further configured to:

control the base station to send a preset number of pilot sequences in each round of downlink beam training;

determine a combined signal corresponding to any training symbol in a current round of downlink beam training received by the UE; and determine a matched filtering output of the combined signal corresponding to the training symbol.

11. The alignment device of claim 10, wherein the processor is further configured to:

combine the matched filtering output of the receiving signals at different signal-to-noise ratios received by the UE by:

$$r_{n,r}=[r_{n,r,k^*,1}\cdots r_{n,r,k^*,L/2}], r\in\{2,3,\ldots,\log_2 M+1\},$$

where $r_{n,1}=[r_{n,1,1,1}\cdots r_{n,1,1,L}, r_{n,1,2,1}\cdots r_{n,1,L_R,L}]$, r represents a training round, n represents any user, k* represents a receiving beam of the UE, $L_R$ represents a size of a receiving codebook at the UE, $L=L_T/M$, and $L_T$ represents a size of a sending codebook at the base station;

successively normalize the receiving signals from individual rounds of downlink beam training and combine normalized signals; and take real and imaginary parts of the normalized signals and the receiving beam at the UE as the training data.

12. The alignment device of claim 11, wherein the processor is configured to:

keep a central angle of the target uplink receiving beam at the base station consistent with the target downlink sending narrow beam based on the asymmetric nature of uplink and downlink beams, and widen a width of the target uplink receiving beam at the base station to a preset beam width.

13. A non-transitory computer-readable storage medium having stored therein computer programs that, when executed by a processor, cause the processor to:

construct a multi-directional beam codebook, and construct an all-digital multi-directional beam for multiple-direction probing through optimized codewords in the codebook;

control a base station to send the multi-directional beam, controlling a user equipment (UE) to receive the multi-directional beam by using a receiving beam, and determining a matched filtering output of receiving signals at the UE for multiple rounds of downlink beam training from the base station to the UE;

control the UE to perform a beam decision according to the receiving signals, and determine a target downlink sending-receiving beam pair with maximum receiving power from the receiving signals received in the multiple rounds of downlink beam training;

perform data processing on the receiving signals at different signal-to-noise ratios received by the UE to generate training data for predicting an uplink sending narrow beam from the UE to the base station, and perform offline training on a preset convolutional neural network via the training data to obtain trained network parameters;

perform online real-time signal detection based on the trained network parameters and the receiving signals at the UE to predict a target uplink sending narrow beam from the UE to the base station; and control the UE to feedback an index of a target downlink sending narrow beam at the base station to the base station, and widen the target downlink sending narrow beam into a target uplink receiving beam at the base station.

14. The non-transitory computer-readable storage medium of claim 13, wherein the processor is configured to:

construct a minimum mean square error function for optimizing the multi-directional beam; and solve the minimum mean square error function by a Riemannian manifold optimization algorithm to obtain optimized codewords transmitted in different directions, and combine the codewords to generate the codebook.

15. The non-transitory computer-readable storage medium of claim 14, wherein the minimum mean square error function is expressed by:

$$\min f(w) = \left\| U^H w \odot (U^H w)^* - g \odot g^* \right\|_2^2$$

$$\text{s.t. } w^H w = 1, g = \begin{cases} W, & \text{if } \emptyset \in \emptyset_{w_i} \\ 0, & \text{else} \end{cases}$$

where w represents a unidirectional beam, $U=[u(\emptyset^1, L_T), \ldots, u(\emptyset^N, L_T)]$, $u(\emptyset^n, L_T)$ represents an array response vector, $\emptyset^n$ represents a departure angle, $\odot$ represents Hadmard product, g represents an ideal gain vector, $L_T$ represents a size of the codebook sent by the base station in downlink transmission, H represents a conjugate transpose operation, and $g^*$ represents an element-wise conjugate of the ideal gain vector; and the all-digital multi-directional beam for multiple-direction probing is constructed by:

$$[w_1(M[1]), w_2(M[2]), \ldots, w_M(M[M])] = \frac{[\tilde{w}(M[1]) + \tilde{w}(M[2]) + \ldots + \tilde{w}(M[M])]}{\|\tilde{w}(M[1]) + \tilde{w}(M[2]) + \ldots + \tilde{w}(M[M])\|_2}$$

where $M[\cdot]$ represents a direction of the multi-directional beam, M represents a number of directions of the multi-directional beam, and $\tilde{w}(\cdot)$ represents an optimized codeword transmitted in any direction.

16. The non-transitory computer-readable storage medium of claim 15, wherein the base station sends a plurality of training symbols and determines a combination of directions for collecting observation signals in any training symbol in each round of downlink beam training from the base station to the UE, and the multiple rounds of downlink beam training from the base station to the UE comprises:

sending, by the base station, a preset number of pilot sequences in each round of downlink beam training;

determining a combined signal corresponding to any training symbol in a current round of downlink beam training received by the UE; and determining a matched filtering output of the combined signal corresponding to the training symbol.

17. The non-transitory computer-readable storage medium of claim 16, wherein performing data processing on the receiving signals at different signal-to-noise ratios received by the UE to generate training data for predicting the uplink sending narrow beam from the UE to the base station comprises:

combining the matched filtering output of the receiving signals at different signal-to-noise ratios received by the UE by:

$$r_{n,r} = [r_{n,r,k^*,1} \cdots r_{n,r,k^*,L/2}], r \in \{2, 3, \ldots, \log_2 M+1\},$$

where $r_{n,1} = [r_{n,1,1,1} \cdots r_{n,1,1,L}, r_{n,1,2,1} \cdots r_{n,1,L_R,L}]$, r represents a training round, n represents any user, k* represents a receiving beam of the UE, $L_R$ represents a size of a receiving codebook at the UE, $L=L_T/M$, and $L_T$ represents a size of a sending codebook at the base station;

successively normalizing the receiving signals from individual rounds of downlink beam training and combining normalized signals; and taking real and imaginary parts of the normalized signals and the receiving beam at the UE as the training data.

18. The non-transitory computer-readable storage medium of claim 17, wherein widening the target downlink sending narrow beam into the target uplink receiving beam at the base station comprises:

keeping a central angle of the target uplink receiving beam at the base station consistent with the target downlink sending narrow beam based on the asymmetric nature of uplink and downlink beams, and widening a width of the target uplink receiving beam at the base station to a preset beam width.

\* \* \* \* \*